(12) United States Patent
Descarsin et al.

(10) Patent No.: US 7,713,585 B2
(45) Date of Patent: May 11, 2010

(54) PLUGGING OF CRACKS ON METAL DEVICES INTENDED TO CONTAIN RADIOACTIVE ACID MATERIALS

(75) Inventors: David Descarsin, Ballan Mire (FR); Jacques Raby, Grenoble (FR); Raphael Robin, Fresnes (FR); Christelle Vittoz, Sotteville (FR)

(73) Assignees: Commissariat a l'Energie Atomique, Paris (FR); Compagnie Generale des Matieres Nucleaires, Velizy-Villacoublay (FR)

( * ) Notice: Subject to any disclaimer, the term of this patent is extended or adjusted under 35 U.S.C. 154(b) by 189 days.

(21) Appl. No.: 11/884,823

(22) PCT Filed: Feb. 20, 2006

(86) PCT No.: PCT/FR2006/050150
§ 371 (c)(1),
(2), (4) Date: Aug. 21, 2007

(87) PCT Pub. No.: WO2006/087501
PCT Pub. Date: Aug. 24, 2006

(65) Prior Publication Data
US 2008/0260953 A1    Oct. 23, 2008

(30) Foreign Application Priority Data
Feb. 21, 2005    (FR) .................................. 05 50464

(51) Int. Cl.
*B05D 3/02*    (2006.01)
(52) U.S. Cl. ..................... 427/385.5; 427/355; 427/358; 427/368; 427/369; 427/372.2; 427/384; 427/388.1; 427/388.2; 427/409; 427/421.1; 427/427.4; 427/427.5
(58) Field of Classification Search .................. None
See application file for complete search history.

(56) References Cited

U.S. PATENT DOCUMENTS

| | | | |
|---|---|---|---|
| 3,577,480 A * | 5/1971 | Thorpe ......................... | 523/516 |
| 3,763,083 A * | 10/1973 | Grotheer ....................... | 523/521 |
| 4,367,201 A | 1/1983 | Vietzke et al. .............. | 422/257 |
| 4,387,171 A * | 6/1983 | Russell ........................ | 523/518 |
| 4,588,753 A * | 5/1986 | Miutel et al. .................. | 521/86 |
| 4,708,977 A * | 11/1987 | Miutel et al. ................ | 523/402 |

FOREIGN PATENT DOCUMENTS

EP    0 136 263 A2    4/1985

OTHER PUBLICATIONS

International Preliminary Seach Report, FA 665112 and FR 0550464, 2 pgs, (Aug. 30, 2005).
Patent Abstracts of Japan, vol. 015, No. 317 (C-0858), (Aug. 13, 1991) & JP 03 121172 A, 1 pg., (Arakawa Chem Ind Co Ltd), (May 23, 1991).
Patent Abstracts of Japan, vol. 003, No. 014 (C-036), (Feb. 8, 1979) & JP 53 140384 A, 1 pg. (Matsushita Electric Works Ltd.) (Dec. 7, 1978).

* cited by examiner

*Primary Examiner*—Erma Cameron
(74) *Attorney, Agent, or Firm*—Nixon Peabody LLP

(57) ABSTRACT

The invention relates to the use of a composition comprising a chlorinated polyester resin in which the polyester satisfies formula (I) below:

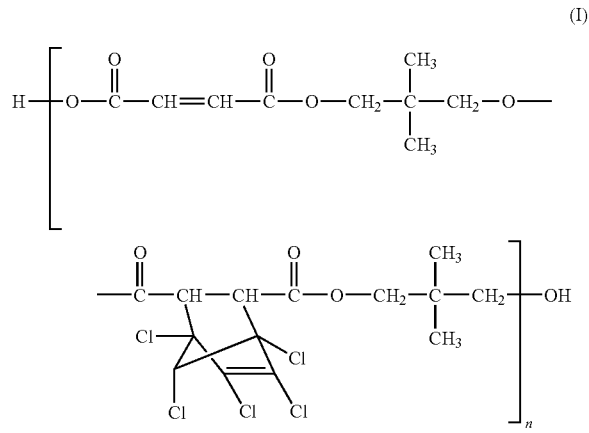

together with a crosslinking catalyst and a crosslinking accelerator in order to plug a crack affecting the wall of a metal device intended to contain a radioactive acid material.

It is especially applicable in the maintenance of metal equipment of nuclear installations, in particular equipment that is for irradiated nuclear fuel reprocessing.

21 Claims, No Drawings

PLUGGING OF CRACKS ON METAL DEVICES INTENDED TO CONTAIN RADIOACTIVE ACID MATERIALS

CROSS REFERENCE TO RELATED APPLICATIONS OR PRIORITY CLAIM

This application is a national phase of International Application No. PCT/FR2006/050150 entitled "Filling Cracks On Metal Devices Designed To Contain Acid And Radioactive Materials", which was filed on Feb. 20, 2006, which was not published in English, and which claims priority of the French Patent Application No. 05 50464 filed Feb. 21, 2005.

TECHNICAL FIELD

The invention relates to the plugging of cracks on metal devices intended to contain radioactive acid materials.

More precisely, it relates to the use of a composition based on a chlorinated polyester resin for plugging localized cracks in the wall of metal devices intended for containing radioactive acid materials.

The invention is especially applicable in the field of the maintenance of metal equipment in nuclear installations, and in particular of equipment used in irradiated nuclear fuel reprocessing.

PRIOR ART

In irradiated nuclear fuel reprocessing installations, many metal devices are used to convey or temporarily store materials laden with nitric acid and with radioactive elements.

At the present time, cracks affecting such equipment is provisionally plugged by applying, to the external surface of the cracked regions, an elastomeric mask and then a sheet of a fluorocarbon material of the fluoroelastomer type.

Now, it turns out the coatings obtained by this plugging method are unsatisfactory in terms of resistance to acid attack.

The inventors were therefore set the objective of finding a composition capable of forming, on the surface of a metal substrate, a liquid-impermeable coating exhibiting, simultaneously, remarkable properties in terms of adhesion to the substrate, acid resistance, including at relatively high temperatures, and radioactive irradiation resistance, especially resistance to γ-radiation, so as to be perfectly suitable for plugging localized cracks in the wall of metal devices intended to contain radioactive materials having a high nitric acid content.

The inventors were also set the objective that this composition should be suitable for plugging localized cracks in vertical walls and plugging cracks affecting horizontal walls, and be able to be easily implemented, in particular by automatable processes.

The inventors were also set the objective that this composition should have a pot life long enough for its use as crack-plugging material to have an acceptable cost.

SUMMARY OF THE INVENTION

These objects, and other ones, are achieved by the invention, which proposes the use of a composition comprising a polyester resin in which the polyester satisfies formula (I) below:

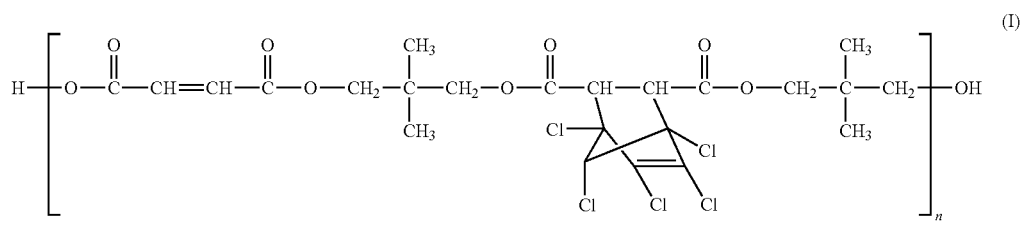

together with a crosslinking catalyst and a crosslinking accelerator in order to plug a crack affecting the wall of a metal device intended to contain a radioactive acid material.

The application of such a composition in one or more layers on the surface of a metal substrate, such as a substrate made of zirconium or stainless steel, makes it possible to obtain, after this or these layers have been dried, liquid-impermeable coatings that adhere to the substrate and are resistant both to acid attack and to radioactive irradiation, in particular to γ-radiation.

A polyester resin as defined above is for example available from Ashland Chemical in two different forms: a ready-to-use liquid form, which is called HETRON® 197 and in which the polyester of formula (I) is already diluted in a reactive solvent, in this case styrene; and a particulate solid form, which is called HETRON® 197G and has to be dissolved in a reactive solvent before use.

Within the context of the invention, either of these forms may be used, the liquid form however being preferred insofar as it makes it possible to dispense with an operation of dissolving the polyester. However, it goes without saying that it is also possible to use the solid form by dissolving it beforehand in a suitable solvent, for example styrene or a styrene derivative.

Nevertheless, it turns out that this resin has, in the liquid state, a relatively short pot life. It is therefore preferable, within the context of its use as base material of a plugging composition, to increase its pot life. This can be achieved in particular by varying on the one hand, the choice of the catalyst and the crosslinking accelerator and, on the other hand, the amounts of these two compounds that are added to the resin.

Thus, the crosslinking catalyst is preferably tert-butyl perbenzoate and advantageously represents from 0.1 to 2% by weight of the total weight of the composition while the crosslinking accelerator is preferably a mixture of cobalt octoate and N,N-dimethylaniline, in particular a 1 to 20% cobalt octoate and N,N-dimethylaniline solution in a phthalate, and advantageously represents from 0.1 to 5% by weight of the total weight of the composition.

The composition may also include a crosslinking inhibitor, the presence of such an inhibitor in the composition making it possible for the pot life of the resin to be further extended.

This crosslinking inhibitor is preferably 4-tert-butylpyrocathecol. It may represent up to 0.5% by weight of the total weight of the composition.

According to the invention, the composition may also include one or more reinforcing fillers if it is desired to optimize the mechanical strength of the coatings intended to be produced with this composition.

Although many types of materials are capable of being used as reinforcing fillers, it is preferred to use materials that have themselves a high acid resistance. This is the reason why the composition preferably includes ECR-type glass fibres as reinforcing filler, since these fibres have the particular feature of exhibiting excellent resistance to acid attack owing to their very low content of alkali metal oxides.

ECR glass fibres that are perfectly suitable for implementing the invention are, for example, the 0.5 mm long ECR fibres sold by Apply-Carbon S.A.

Whether or not it contains one or more reinforcing fillers, the composition may furthermore include a thixotropic agent suitable for adjusting the rheological properties of the composition depending on the type of plugging that it is desired to produce.

Thus, for example, the use of a thixotropic agent may be useful for limiting, when the composition is applied to the surface of a vertical wall, its flow along this wall, and to increase the thickness of the layer obtained at each application. Thus, for example, the addition of pyrogenic silica in an amount of 3% by weight of the total weight of the composition, enables this thickness to be increased by a factor of 2.5 in the case of a composition containing no reinforcing filler and by a factor of 3 in the case of a composition including reinforcing fillers, compared with the thickness obtained with similar compositions but containing no thixotropic agent.

The thixotropic agent may be any compound conventionally used to modify the rheological properties of a composition based on a polyester resin, such as for example talc, colloidal silica, pyrogenic silica and bentonite, pyrogenic silica however being preferred.

The composition may further include other additives such as a fire retardant, for example antimony trioxide or pentoxide, suitable for improving its fire behaviour—even though this is already very satisfactory—or a colourant intended to give it a particular colour.

The composition may be prepared by adding to the resin (already dissolved in the reactive solvent) in succession and in the following order: the crosslinking accelerator, the crosslinking inhibitor and the crosslinking catalyst, and then, where appropriate, the reinforcing filler or fillers, the thixotropic agent and the optional other additives, and, after each addition, carrying out a mixing operation, advantageously by means of an electric mixer, for example a mixer fitted with a flat-blade metal anchor stirrer, so as to obtain a composition that is as homogeneous as possible. After resting for around ten minutes, in order for it to be degassed, the composition is ready to be used.

Its use for plugging a localized crack in the wall of a metal device is extremely simple. This plugging operation comprises the application of one or more layers of the composition, typically 1 to 3 layers, on the surface of the cracked region of the wall, or even the entire surface of the wall if there are many cracks, followed by the drying of this layer or all of these layers.

This drying may be carried out by leaving said layer or all of said layers to dry at room temperature (20-25° C.). However, the drying may also be accelerated by applying ventilation or gentle heating.

According to the invention, the layer or layers of composition are preferably applied after the surface to be treated has been prepared so as to ensure optimum adhesion of the composition to this surface. This preparation comprises, for example, one or more cleaning operations using organic solvents, optionally supplemented with one or more sandblasting operations and/or one or more rinsing operations using demineralized water.

When several layers of composition are applied to the surface to be treated, it is preferable to deposit the final layer only after the previous layer or layers deposited on this surface have been dried. This thus promotes the bonding of the final layer to the underlying layers.

Although it is possible to use, for applying the layers of the composition, any technique conventionally used for coating a substrate with a resin-based composition, it is preferred to use a brush supplied from a pressurized syringe or to use air spraying.

This is because the use of a brush supplied from a pressurized syringe proves to be particularly suitable for plugging localized cracks in a wall or in part of a wall that is difficult to access. It also allows good penetration of the composition into all the anfractuosities of the wall, and thus guarantees excellent adhesion of the coating, obtained after the composition has cured, to this wall.

As regards air spraying, this proves to be particularly suitable for plugging localized cracks in a wall or part of a wall with little visual access. It also has the advantage of being inexpensive, easy to implement and usable on walls of any dimensions.

These two techniques are applicable to a composition as defined above, irrespective of whether or not it includes one or more reinforcing fillers, air spraying however requiring the viscosity of the composition to be adapted to the spray gun that it is desired to use. This can be easily accomplished by increasing the reactive solvent content of the composition.

Furthermore, said techniques have the advantage of being automatable.

If the conditions so allow, it is also preferable, after drying, to subject the layer or all the layers of composition deposited on the surface of the cracked region of the wall to a heat treatment, such a treatment proving to optimize the crosslinking of the resin and, consequently the acid resistance of the resulting coating. This heat treatment is preferably carried out in a ventilated enclosure provided with a heating system, for example an oven, and consists in heating said surface for 2 to 3 hours at a temperature of around 80 to 100° C. Preferably, the temperature of the enclosure is raised and lowered very gradually, for example at 2° C. per minute.

To plug very localized through-cracks, it is preferred to use the composition of the invention in combination with one or more layers of a reinforcing material.

In this case, the reinforcing material is preferably a glass veil, and especially a type-C glass veil, which itself exhibits excellent resistance to acid attack. This type of veil is available from Arnaud.

Also in this case, the plugging of a crack preferably comprises the following steps:

a) a first layer of composition is applied on the surface of the cracked region of the wall;

b) a first layer of reinforcing material is applied on this layer of composition, by pressing on the layer of reinforcing material in order for it to be impregnated with the composition;

c) a second layer of reinforcing material is applied on the first layer of reinforcing material;

d) a second layer of composition is applied on the second layer of reinforcing material; and then e) after the first and second layers of composition have been dried, a final layer of composition is applied.

In steps a), d) and e), and most particularly in steps d) and e), the layers of composition are applied by means of a brush supplied from a pressurized syringe, since the pressure liable to be exerted on the reinforcing material by a spray gun risks introducing air bubbles into this material that would subsequently impair the coating obtained after crosslinking the resin.

Advantageously, step e) is followed by a heat treatment step carried out under the same conditions as those indicated above.

According to the invention, the metal device may be intended both for conveying the radioactive acid material and to store it, whether temporarily or over a prolonged period of time.

However, it is preferably a device of an irradiated nuclear fuel reprocessing installation.

The invention will be better understood on reading the rest of the following description, which relates to examples of the preparation of useful compositions according to the invention, the use of these compositions in combination with a reinforcing material, and the demonstration of their properties.

It goes without saying that these examples are given merely by way of illustration of the subject matter of the invention and do not in any way constitute a limitation of this subject matter.

DETAILED DESCRIPTION OF PARTICULAR EMBODIMENTS

EXAMPLE 1

Plugging Composition not Containing a Reinforcing Filler, Suitable for being Applied with a Brush Supplied from a Pressurized Syringe A plugging composition having the following formulation was prepared:

| | |
|---|---|
| HETRON ® 197 resin (Ashland Chemical) | 96.8 g |
| CA-12 accelerator (Ashland Chemical) | 1.0 g |
| TC 510 inhibitor (Ashland Chemical) | 0.2 g |
| TBPB-HAM1 catalyst (Ashland Chemical) | 2.0 g |

To do this, the resin was introduced into a plastic pot to which were added, in succession and in the following order, the crosslinking accelerator, the crosslinking inhibitor and the crosslinking catalyst, these being mixed, after each addition, for 2 minutes by means of an electric mixer fitted with a flat-blade metal anchor stirrer (rotation speed: 300 rpm) in order to obtain a homogeneous composition.

The composition thus prepared has a pot life of about 4 hours at room temperature (20-25° C.).

By applying this composition to the surface of metal substrates by means of a brush supplied from a pressurized syringe it was possible to obtain uniform coatings containing no defects, that is to say neither bubbles nor cracks, when examined using a binocular microscope.

EXAMPLE 2

Plugging Composition not Containing a Reinforcing Filler, Suitable for being Applied by Air Spraying A plugging composition having the following formulation was prepared:

| | |
|---|---|
| HETRON ® 197 resin (Ashland Chemical) | 90.0 g |
| CA-12 accelerator (Ashland Chemical) | 1.0 g |
| TC 510 inhibitor (Ashland Chemical) | 0.2 g |
| TBPB-HAM1 catalyst (Ashland Chemical) | 2.0 g |
| Styrene | 7.0 g |

The procedure was as in Example 1 above, except that the resin was diluted with styrene before the crosslinking accelerator, the crosslinking inhibitor and the crosslinking catalyst were added to it.

A fluid composition was thus obtained which could be easily sprayed with an air gun, the pot life of said composition being about 4 hours at room temperature (20-25° C.).

This composition, applied to the surface of metal substrates by air spraying, resulted in homogeneous coatings of constant thickness and free of visible defects.

EXAMPLE 3

Plugging Composition not Containing a Reinforcing Filler, Suitable for being Applied by Air Spraying A plugging composition having the following formulation was prepared:

| | |
|---|---|
| HETRON ® 197 resin (Ashland Chemical) | 95.0 g |
| CA-12 accelerator (Ashland Chemical) | 3.0 g |
| TBPB-HAM1 catalyst (Ashland Chemical) | 2.0 g |

To do this, the resin was introduced into a plastic pot to which were added the crosslinking accelerator and then, after homogenization, the crosslinking catalyst. The mixture was then homogenized for about 10 minutes.

The composition thus prepared had a pot life of about 1 hour at room temperature (20-25° C.) and 12 hours at 5° C.

It was therefore kept at 5° C. before being sprayed.

This composition, applied to the surface of metal substrates by means of an air gun fitted with a pressurized reservoir (for example, by applying a pressure of 5 bar to the reservoir and a pressure of 2 bar at the nozzle), allowed homogeneous coatings to be deposited with a constant thickness and free of visible defects.

EXAMPLE 4

Plugging Composition Containing a Reinforcing Filler, Suitable for being Applied with a Brush Supplied from a Pressurized Syringe A plugging composition having the following formulation was prepared:

| | |
|---|---|
| HETRON ® 197 resin (Ashland Chemical) | 74.5 g |
| CA-12 accelerator (Ashland Chemical) | 1.0 g |
| TC 510 inhibitor (Ashland Chemical) | 0.1 g |
| TBPB-HAM1 catalyst (Ashland Chemical) | 1.4 g |
| 0.5 mm ECR glass fibres (Apply-Carbon S.A.) | 20.0 g |
| R812 pyrogenic silica (Degussa) | 3.0 g |

To do this, the resin was introduced into a plastic pot to which were added, in succession, the crosslinking accelerator, the crosslinking inhibitor and the crosslinking catalyst as described in Example 1 above.

The glass fibres were then incorporated into the resulting mixture and this was all mixed for 11 minutes using an electric mixer (rotation speed: 300 rpm). The pyrogenic silica was then added and the mixture mixed for a further 10 minutes (rotation speed: 300 rpm).

The composition thus prepared had a pot life of about 4 hours at room temperature (20-25° C.).

By applying it to the surface of metal substrates by means of a brush supplied from a pressurized syringe it was possible to obtain uniform coatings free of visible defects.

EXAMPLE 5

Plugging Composition Containing a Reinforcing Filler, Suitable for being Applied with a Brush Supplied from a Pressurized Syringe A plugging composition having the following formulation was prepared:

| | |
|---|---|
| HETRON ® 197 resin (Ashland Chemical) | 95.0 g |
| CA-12 accelerator (Ashland Chemical) | 3.0 g |
| TBPB-HAM1 catalyst (Ashland Chemical) | 2.0 g |
| Glass fibres | 0.8 g |

The glass fibres were introduced in pinches into the resin. After homogenization, the crosslinking accelerator and the crosslinking catalyst were added to the resin/glass fibre mixture, within the procedure of Example 3 above.

The composition thus obtained was kept at 5° C. for the time needed to prepare the work.

Its application to the surface of metal substrates, especially vertical ones, by means of a brush supplied from a pressurized syringe made it possible, here again, to obtain uniform coatings free of visible defects.

EXAMPLE 6

Use of a Plugging Composition in Combination with a Reinforcing Material

The cracks in a substrate were plugged in the following manner:
- a first layer of a plugging composition identical to that prepared in Example 1 above was applied to the surface of the cracked regions of this substrate using a brush supplied from a pressurized syringe;
- a first ply of a type-C glass veil (from Saint-Gobain Vetrotex) was applied on this layer, by pressing on this veil so as to make the composition penetrate thereinto, while ensuring that no bubbles were created;
- a second ply of type-C glass veil was applied to this first ply;
- a second layer of plugging composition was applied to this second ply; and then,
- after drying for 24 hours at room temperature (20-25° C.), this was all covered with a final layer of plugging composition.

The substrate was placed in a ventilated oven heated to a temperature of 100° C. at a rate of 2° C. per minute. This temperature was maintained for 3 hours in the enclosure, before the temperature was brought back down, at a rate of 2° C. per minute, to room temperature.

EXAMPLE 7

Demonstration of the Properties of the Coatings Obtained with the Plugging Compositions The properties of the coatings obtained with the plugging compositions as prepared in the above examples, and especially their γ-radiation resistance and their nitric acid resistance, were demonstrated by a series of tests.

As regards the γ-radiation resistance, cracked metal parts, the cracks of which were plugged with these plugging compositions, and flexural test specimens (L×W×T: 80×10×4 mm) machined into plates prepared from these same compositions were continuously exposed to γ-radiation (cobalt 60 source) in the ambient air.

As metal parts, stainless steel discs 100 mm in diameter were used, a through-crack having been produced at the centre of said discs by electrical discharge machining.

After these discs had been plugged, they were subjected to a surface treatment intended to ensure optimum adhesion of the plugging compositions, comprising:
- first cleaning with acetone;
- sandblasting for 2 to 3 minutes (fine corundum grains with a pressure of 3 kg/cm$^2$);
- second cleaning with acetone;
- third cleaning with trichloroethylene; and
- two rinsings with demineralized water.

The flexural test specimens were produced according to Standard NF EN ISO 178: a plate was prepared and then the test specimens were machined according to Standard ISO 2818.

The effects of the γ-irradiation on the coatings for plugging the metal parts on the one hand, and on the flexural test specimens on the other hand, were assessed by subjecting them to two-dimensional measurements and examination under a binocular microscope, before and after irradiation, and by comparing the results obtained. The flexural test specimens were also subjected to three-point bending tests according to Standard NF EN ISO 178.

In this case, the two-dimensional measurements and the examination under a binocular microscope revealed no appreciable change in the dimensions, nor in the appearance, of the coatings plugging the metal parts after irradiation and this was so whatever the plugging composition used. The same applied to the flexural test specimens.

As regards the bending tests, these showed that although the γ-irradiation had no appreciable effect on the flexural modulus of the test specimens, they did however cause a significant increase in the flexural strength in the tested range.

By way of example, Table 1 below gives the results of the bending tests carried out, before and after irradiation (integrated dose: 10$^5$ Gy), on nine test specimens coming from a plate produced with the plugging composition prepared in Example 1 above.

TABLE 1

| Test specimen | Flexural modulus (GPa) | | Flexural strength (MPa) | | Strain at break | |
|---|---|---|---|---|---|---|
| | Before irrad. | After irrad. | Before irrad. | After irrad. | Before irrad. | After irrad. |
| 1 | 3.53 | 3.59 | 79.97 | 101.13 | 0.0239 | 0.0318 |
| 2 | 3.60 | 3.64 | 79.07 | 87.13 | 0.0236 | 0.0266 |
| 3 | 3.53 | 3.60 | 97.00 | 93.95 | 0.0299 | 0.0289 |
| 4 | 3.61 | 3.60 | 87.21 | 99.23 | 0.0261 | 0.0314 |
| 5 | 3.63 | 3.67 | 82.52 | 84.29 | 0.0246 | 0.0253 |
| 6 | 3.58 | 3.69 | 77.04 | 80.13 | 0.0232 | 0.0240 |
| 7 | 3.55 | 3.62 | 80.14 | 86.29 | 0.0240 | 0.0265 |
| 8 | 3.55 | 3.62 | 81.02 | 98.35 | 0.0243 | 0.0306 |
| 9 | 3.52 | 3.64 | 77.61 | 96.37 | 0.0233 | 0.0301 |

Thus, the table shows that the mechanical properties of the coatings obtained with the useful plugging compositions according to the invention are not degraded by the γ-radiation and that they are even enhanced by this radiation within the tested range.

As regards the nitric acid resistance, the metal parts, after having been subjected to γ-radiation, were fitted onto glass reactors containing a nitric (6N) liquid medium by means of clamps so that only that face of the parts bearing the plugging coating were in contact with this medium. Since sealing was provided between the metal parts and the reactors by means of polytetrafluoroethylene-coated VITON® O-ring seals, the nitric medium could therefore flow to the outside of the reactors only via the plugged cracks of the metal parts.

The sealing of the plugging coatings and their nitric acid resistance were assessed by regularly checking the metal parts over several months and by carrying out expert assessments at the ends of the tests.

The regular checking consisted in detecting for any leak at the cracks by means of litmus paper. To do this, the litmus paper was rubbed over the plugging coatings, any red coloration of the paper clearly indicating the existence of a leak through the cracks, synonymous with a sealing break.

The expert assessments consisted in weighing the metal parts after being rinsed with water and dried in an oven, in visually determining the change in the plugging coatings by macrographic examinations and any loss of adhesion of these coatings at the interface by metallographic examinations from sections cut perpendicular to the cracks.

The regular checking with litmus paper failed to detect any leak of the nitric medium through the cracks. No loss of sealing was therefore observed.

Modifications to the coatings were limited to a change in their colour, which was probably due to natural ageing in air under the test conditions.

The weight losses proved to be small for all the metal parts tested and relatively equivalent to one another (less than 0.5%). Here again, this denotes very good nitric acid resistance of the coatings The metallographic examinations showed no sign due to possible migration of acid around the cracks on the opposite face of the coatings from that in contact with the nitric medium. For all the parts, no sign of shrinkage was observed at the coating/steel interface, which confirmed that the adhesion of the coatings to metal substrates was not impaired by the presence of nitric acid.

The invention claimed is:

1. A process for plugging a crack affecting the wall of a metal device intended to contain a radioactive acid material, said process comprising the steps of:

applying at least one layer of a composition comprising a chlorinated polyester resin in which the polyester satisfies formula (I) below:

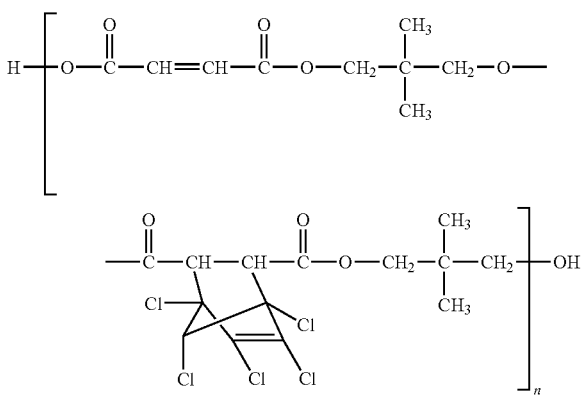

together with a crosslinking catalyst and a crosslinking accelerator, on the surface of the cracked region of the wall; and drying said at least one layer of composition.

2. The process of claim 1, in which the crosslinking catalyst is tert-butyl perbenzoate.

3. The process of claim 1, in which the crosslinking catalyst represents from 0.1 to 2% by weight of the total weight of said composition.

4. The process of claim 1, in which the crosslinking accelerator is a solution comprising 1 to 20% by weight of cobalt octoate, 1 to 20% by weight of N,N-dimethylaniline, and 60-98% by weight of a phthalate.

5. The process of claim 1, in which the crosslinking accelerator represents from 0.1 to 5% by weight of the total weight of said composition.

6. The process of claim 1, in which the composition also includes a crosslinking inhibitor.

7. The process of claim 1, in which the crosslinking inhibitor is 4-tert-butylpyrocatechol and represents up to 0.5% by weight of the total weight of the composition.

8. The process of claim 1, in which the composition also includes one or more reinforcing fillers.

9. The process of claim 8, in which the composition includes ECR-glass fibers.

10. The process of claim 1, in which the composition furthermore includes a thixotropic agent.

11. The process of claim 1, in which said at least one layer of said composition is applied by brushing material squirted from a pressurized syringe, or by air spraying.

12. The process of claim 11, which after the step of drying, further comprises heating the at least one layer of composition for 2 to 3 hours at a temperature of around 80 to 100° C.

13. The process of claim 1, further comprising the step of applying one or more layers of a reinforcing material.

14. The process of claim 13, in which the reinforcing material is a C-glass veil.

15. The process of claim 1, in which:
 a) a first layer of said composition is applied on the surface of the cracked region of the wall;
 b) a first layer of reinforcing material is applied on the first layer of composition, by pressing on the layer of reinforcing material in order for it to be impregnated with the composition;

c) a second layer of reinforcing material is applied on the first layer of reinforcing material;
d) a second layer of said composition is applied on the second layer of reinforcing material; and then
e) after the first and second layers of composition have been dried, a final layer of said composition is applied.

16. The process of claim 15, in which the layers of said composition are applied by brushing material squirted from a pressurized syringe.

17. The process of claim 15, which further includes, after step e), heating the layers of composition deposited on the cracked region of the wall for 2 to 3 hours at a temperature of around 80 to 100° C.

18. The process of claim 1, in which the metal device is adapted for carrying the radioactive acid material.

19. The process of claim 1, in which the metal device is adapted to store the radioactive acid material.

20. The process of claim 1, in which the irradiated radioactive acid material comprises spent nuclear fuel.

21. The process of claim 10, wherein the thixotropic agent is pyrogenic silica.

* * * * *